US007045968B1

(12) United States Patent
Bierman et al.

(10) Patent No.: US 7,045,968 B1
(45) Date of Patent: May 16, 2006

(54) SELF-COMMISSIONING DAYLIGHT SWITCHING SYSTEM

(75) Inventors: Andrew Bierman, Albany, NY (US); Russell P. Leslie, Shaftsbury, VT (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 10/981,351

(22) Filed: Nov. 4, 2004

(51) Int. Cl.
*H05B 37/00* (2006.01)
(52) U.S. Cl. ..................................... 315/244
(58) Field of Classification Search ............... 315/224, 315/149, 150, 151, 153, 159
See application file for complete search history.

(56) References Cited

U.S. PATENT DOCUMENTS

| | | | |
|---|---|---|---|
| 4,021,679 A | 5/1977 | Bolle et al. | |
| 4,023,035 A | 5/1977 | Rodriguez | |
| 4,461,977 A | 7/1984 | Pierpoint et al. | |
| 4,523,132 A | 6/1985 | Christiansen et al. | |
| 4,701,669 A | 10/1987 | Head et al. | |
| 5,357,170 A | 10/1994 | Luchaco et al. | |
| 5,498,931 A | 3/1996 | Bedocs | |
| 5,668,446 A | 9/1997 | Baker | |
| 5,701,058 A | 12/1997 | Roth | |
| 5,894,175 A | 4/1999 | Berlin et al. | |
| 5,977,717 A * | 11/1999 | Dean ......................... | 315/156 |
| 6,003,160 A | 12/1999 | Seidle et al. | |
| 6,028,396 A * | 2/2000 | Morrissey et al. ........... | 315/119 |
| 6,225,760 B1 * | 5/2001 | Moan ......................... | 315/360 |
| 6,294,874 B1 | 9/2001 | Rudolph et al. | |
| 6,422,714 B1 | 7/2002 | Hubbell | |
| 6,583,573 B1 | 6/2003 | Bierman | |
| 6,841,944 B1 * | 1/2005 | Morrissey et al. ........... | 315/119 |
| 6,888,323 B1 * | 5/2005 | Null et al. .................... | 315/294 |
| 2004/0124786 A1 * | 7/2004 | Morrissey, Jr. et al. ...... | 315/291 |

OTHER PUBLICATIONS

F. Rubinstein, Photoelectric Control of Equi-Illiumination Lighting Systems, Energy and Buildings, 6 (1984), pp. 141-150.
A. Bierman and K. M. Conway, Characterizing Daylight Photosensor System Performance to Help Overcome Market Barriers, Journal of the Illuminating Engineering Society, (Winter 2000), pp. 101-115.
R. Mistrick, C-H Chen, A. Bierman, D. Felts; A Comparison of Photosensor-Controlled Electronic Dimming Systems in a Small Office, Journal of the Illuminating Engineering Society, (Winter 2000), pp. 66-80.
A Power Point slide shown at a conference in Cleveland, OH on Mar. 23, 2003.

* cited by examiner

*Primary Examiner*—Trinh V Dinh
*Assistant Examiner*—Minh Dieu A
(74) *Attorney, Agent, or Firm*—RatnerPrestia

(57) ABSTRACT

A method of commissioning a switch to control an electric luminaire in an indoor space responsive to signals from a photosensor. A first plurality of sensor signal values is calculated when the photosensor is disposed at a first location within the space. A second plurality of sensor signal values is calculated when the photosensor is disposed at a second location within the space. A first threshold value is calculated for switching on the luminaire when light in the space is less than a first value. A second threshold value is calculated for switching off the luminaire when light in the space is greater than a second value.

8 Claims, 12 Drawing Sheets

Flow Chart of the DaySwitch Main Algorithm

Flow Chart of the DaySwitch Main Algorithm

Flow Chart of the 'Initial Check' Procedure

Flow Chart of the 'Commisioning' Procedure

Flow Chart of the 'Photosensor' Procedure

Alternate Flow Chart of the 'Photosensor' Procedure

SELF-COMMISSIONING DAYLIGHT SWITCHING SYSTEM

FIELD OF THE INVENTION

The present invention relates generally to lighting control systems and, more particularly, to a switch and control system for switching a lighting fixture on and off to reduce power consumption.

BACKGROUND OF THE INVENTION

Electric-powered lighting in commercial buildings in the United States accounts for 23% of the electricity consumed. Although the efficacy of the fluorescent lamp, the dominant electric-powered lighting source in the commercial sector, is unlikely to increase significantly during the next decade, there are significant opportunities to reduce energy consumption used for lighting in commercial applications. These opportunities are created by using daylight (or solar light) more effectively by controlling the amount of electric-powered light delivered in response to available daylight. Studies undertaken over the past 20 years have consistently shown that electric energy used to generate light in commercial buildings can be reduced by 10%–30% by using a photosensor to switch electric-powered light when daylight is available, and to maintain the electric light levels at design levels throughout lamp life. Consumers perceive daylight dimming systems as ineffective, however, and are reluctant to install lighting control systems that dim or switch electrical lighting fixtures when daylight is present.

Illumination control is difficult because the sensor, for practical reasons, is usually located on the ceiling or high on a wall, while "useful" illumination is more closely associated with illumination of the task or work-plane (typically a desktop). Moreover, the ratio for the illumination level at the task location to the illumination level at the operational sensor location is different for daylight and electric light. This difference is due to multiple factors including room geometry and incident angles of the light source to the work surface.

A lighting control system employing a control algorithm that merely tries to maintain a constant sensor signal will not provide, in fact, adequate useful illumination as the distribution of light within the space changes to a higher composition of daylight. Task-to-ceiling illumination ratios typically vary by a factor of five or more when going from the conditions of 100% electric-powered lighting to 100% daylight. Therefore, the sensor signal does not increase proportionally with the illumination of the task location. The typical outcome is that too many electric-powered lights are switched off in the presence of daylight. Occupants then complain of insufficient light and the control is disabled.

To overcome the problem of variable task-to-sensor light level ratios for daylight and electric light, proportional control systems have been suggested. Proportional control systems require commissioning, however, which can be difficult and expensive thus limiting their effective use. Most products on the market do not offer sufficient adjustment capabilities (both in terms of adjustment mechanics and range of adjustment) to allow easy commissioning. Many photosensors must be moved to different locations using a trial-and-error approach to get satisfactory performance. Such movement is time consuming, aggravating, and expensive. For at least these reasons, commissioning is often not done completely or properly and the systems fail to work as intended.

The cost of installation and commissioning is another reason that consumers are reluctant to install lighting control systems to switch electrical lighting fixtures when daylight is present. Commissioning current photosensor lighting control systems typically requires the use of extraneous light meters. Frequently commissioning must be performed during multiple daylight conditions, sometimes including measurements in the absence of daylight.

Another problem is that some users do not prefer the same level of illumination as the proportion of daylight to total available light changes. Preference studies have shown that, under some circumstances, people want higher levels of illumination as interior daylight levels increase.

An additional photosensor problem is that, when different sensors are used for commissioning measurements taken at different locations, they can have different sensitivity to infrared (IR) radiation. This difference affects system performance because daylight contains much more infrared radiation than fluorescent lighting for the same amount of visible light. Therefore, the photosensor switches the electric lighting when it is essentially sensing invisible IR radiation rather than visible light.

Photosensors have been available for use in interior spaces for many years, but during this time have achieved dismal market penetration due to a number of factors. One primary reason for their lack of market acceptance has been cost. Current photosensors can range from a low of nearly $50.00 to over $100.00 each. A building owner must then factor in the cost of installation. Because nearly all existing photosensors require additional wiring, the cost to install them in existing buildings becomes prohibitive. Even in new construction, this need for additional wiring can add to installation costs. After installation, each photosenor in a building must be individually commissioned. This is a difficult and time-consuming process, often requiring several return visits by a lighting specialist before building occupants are satisfied with the results.

Most current photosensors are also designed to work in conjunction with dimming electronic ballasts in fluorescent lighting systems. These ballasts typically cost three times as much as conventional "instant-start" ballasts and in some cases may actually shorten the life of the fluorescent lamps they operate. In addition, because dimming ballasts are designed with "rapid-start" circuitry (to maintain the lamp cathode heating necessary for dimming) they use more energy than instant start ballasts, even when the lamps they operate are not being dimmed. Many dimming ballasts are also designed to maintain the light output of the lamps they operate about at least 5% when used with photosensors. Consequently, the lamps are always on. This uses some amount of energy (about 15%) as opposed to a 100% savings when there is a complete shut off. Finally, after incurring all of these additional costs, a building owner is never assured that the photosensors installed in his or her building will operate effectively over time. Because each photosensor will typically control a number of lighting fixtures in a space, some areas may be too dark while others are overlighted because daylight rarely penetrates uniformly into a building's interior. Also, daylight penetration may vary at adjacent workstations because workers operate blinds or there are exterior window obstructions.

Significant effort has been directed to solving these problems as evidenced by patents and other references directed to proposed solutions. A summary of some of the more pertinent references follows.

U.S. Pat. No. 4,023,035 issued to Rodriguez discloses a light-sensitive lamp adapter which is small enough to fit in an indoor or outdoor lamp between the lamp socket and a light bulb. The light-sensitive electronic circuitry is entirely contained within the adapter. An adjustable window on the side of the adapter allows the user to have the adapter respond only to light of a selected intensity and incidence on the adapter. The adapter is also characterized by the small size of its internal electronic circuitry and the mode of mounting that circuitry. A solid state switch arrangement in the form of an integral triac/diac chip assembly is mounted directly to a metallic disk positioned against the base of the adapter. Therefore, the '035 patent addresses retrofit for a light-sensitive lamp adapter. This subject matter differs from the present invention in that it is for incandescent sockets only and does not have a self commissioning feature that will allow proper operation under all conditions (e.g., walking between the table lamp and the window could turn on the lights).

U.S. Pat. No. 4,701,669 issued to Head et al. describes a ratio method for commissioning which has similarities in common with the subject invention. The method requires two photo-sensors, however, and does not utilize Andrew Bierman's self-commissioning device innovation. This reference is directed to a compensated light sensor system for controlling the level of light at a work plane so that the level of light at the work plane is maintained substantially constant as daylight entering the room varies.

U.S. Pat. No. 5,668,446 issued to Baker discloses an energy-saving lighting control system for operating fluorescent light fixtures. Light level is controlled according to the light required for the task being done in the area. Sensors detect occupancy and light level. The system provides time-of-day scheduling minimum and maximum lighting levels. A building is divided into several zones, with several zone controllers controlling and powering one or more fluorescent light fixtures and operating the sensors. The zone controllers also transmit manually operated switch inputs that provide on-off and light level requests directly from occupants in the zone. Each fluorescent fixture within each distinct zone receives control signals from a zone controller associated with each distinct zone. Each control zone could have from one to tens of light fixtures, all responding to the same control signals. A central computer passes sensor information between zones to reduce the number of sensors required in a given building. The zone controllers are slaves of the central control computer in that they do not initiate a transmission onto the power line unless they receive a command from the central computer to do so. The central computer allows the operator to directly control light levels in the zone and set minimum and maximum light levels that are suitable for each control zone.

U.S. Pat. No. 5,701,058 issued to Roth is directed to a method of semi-automatic ambient light sensor calibration in an automatic control system. The method utilizes a light meter and a programmer communicating with the lighting control system. The programmer senses the lighting level at the point of interest via the light meter and interactively adjusts the lighting level through the lighting control system, which controls the power controller for the lighting lamps, usually by a dimmable ballast. By reading the ambient light levels with the outdoor lighting at both minimum and maximum levels and with the electrical lighting at both minimum and maximum levels, the programmer calculates the electronic gain and set point required to provide adequate light to the point of interest at any outdoor light level. The method calculates a set point and a gain which are utilized to maintain a constant lighting level at a lighting point of interest. The method requires a technician to enter information into the programmer and to close and open window shades a number of times. The programmer calculates the values of electronic gain and set point based on eight light measurements (see column 5, lines 21–23).

U.S. Pat. No. 5,977,717 issued to Dean discloses a lighting control system that uses a photo-sensor, a comparative circuit, and a logic switching circuit to sense light intensity levels. The system compares the output from the photo-sensor with a number of preset levels in order to produce a logic output which controls the switching of the logic switching circuit between four states: daylight, dusk, night, and dawn. The system avoids the problem of repeated switching on and off as a result of transient light intensity variations. After the light switches on, it will not switch off again until the light intensity rises above another higher predetermined level. After the light switches off, it will switch on again only if the light intensity falls below a different, lower, predetermined value.

U.S. Pat. No. 6,583,573 issued to Bierman discloses a photo-sensor and control system for dimming lighting fixtures to reduce power consumption. The system decreases the amount of controlled light in response to the presence of both uncontrolled ambient light and controlled electric light, the difference in the ratios of an illumination level at a task location to an illumination level at an operational sensor location for uncontrolled light and controlled light, and a user's lighting preference. The photo-sensor of the disclosed invention may be self-commissioned to compensate for the difference in illumination ratios.

The photo-sensor includes a self-powered photocell unit having a photodiode and a wireless transmitter. This arrangement allows the photocell unit to be easily moved for the commissioning procedure. In addition, all commissioning regimens can be taken using the same photodiode, reducing variability caused by differences in sensitivity to spectral differences between daylight and electric light.

With reference to the figures of the '573 patent, the commissioning procedure is programmed into photo-sensor 100 which, in turn, controls the electrical lighting fixture 10 and, therefore, can measure illumination levels with and without electric light 30, calculating the illumination from electric light 30 by subtraction. A commissioning button 118 is provided for operator input during the commissioning. An operator initiates the programmed commissioning procedure by positioning photocell unit 110 at task location 4 as shown in FIG. 7, and pressing commissioning button 118. Photo-sensor 100 then automatically measures the combined daylight 20 and electric light 30 illumination level at task location 4, turns off the electrical light fixture 10, measures the daylight 20 illumination level at task location 4, turns on the electrical lighting fixture 10, and prompts an operator to move photocell unit 110. The operator positions photocell unit 110 at operational sensor location 2, as shown in FIG. 2, and again presses commissioning button 118. Photo-sensor 100 then automatically measures the combined daylight 20 and electric light 30 illumination level at operational sensor location 2, turns off electrical lighting fixture 10, measures a daylight 20 illumination level at operational sensor location 2, turns on electrical lighting fixture 10, and calculates set-point and ratios for use by an illumination control algorithm to compensate for differences in task-to-sensor illumination ratios between daylight and electric light.

A publication entitled "Photoelectric control of equi-illumination lighting systems" by F. Rubinstein, published in Energy and Buildings, 6, pp. 141–150 (1984) discloses a photo-electrically controlled lighting system to maintain a constant light level on a task surface by responding to changing daylight levels. The system is affected by the control algorithm used to relate the photo-sensor signal to electric light levels and by the geometry and location of the photo-sensor. The article discloses equations for a control processor signal that separate the signal into electric light and daylight components. The system consists of three basic components: (1) a control photo-sensor that generates an electrical signal proportional to the amount of light impinging on its surface; (2) a logic circuit that incorporates a control algorithm to process the photo-sensor's signal and convert it to a control signal for a dimming unit; and (3) a dimming unit that smoothly varies the electric light output by altering the amount of power flowing to the lamps. The system can be applied to high-frequency ballasted systems capable of controlling individual fixtures.

The article states, "the algorithm employed by the control system is of crucial importance . . . [T]he simpler the form of the algorithm, the simpler it is to design and operate the system." See page 143. The simplest control algorithm is a constant set-point algorithm. Once the daylight component of light sensed by the photo-sensor exceeds the maximum defined by the equations, the control system turns off the electric lighting. See page 144.

U.S. Pat. No. 5,357,170 issued to Luchaco et al. discloses a light control system with a priority override. The system is selectively operable in either a normal mode or an off-normal mode. In the normal mode, certain lighting parameters (e.g., maximum and minimum light levels and fade rates) are preset and lighting level is determined by which of a plurality of inputs requires the least electrical power. In the off-normal mode (e.g., a calibration or light-adjustment mode), certain parameters are adjustable by manually adjusting the position of a wiper blade in a potentiometer. A microprocessor-based logic and control unit is adapted to automatically switch from the normal operating mode to the off-normal mode in response to movement of the wiper blade. After a predetermined time period following the most recent movement of the wiper blade, the logic and control unit stores the new level of the adjusted parameter and returns to the normal operating mode.

U.S. Pat. No. 5,498,931 issued to Bedocs discloses automatic switching and control of lighting in a localized area. The switching of the lighting is dependent on the presence or absence of a person in the localized area. The control of the lighting intensity is dependent on the sensed background level of lighting in the localized area. A photocell detects the light level in the operation range. Control electronics receive a signal from the photocell indicating the level of light that is being detected. If the photocell receives a level of light above the turn-off level, the electronics delays a predetermined amount of time before decreasing the lamp output. After that, the control electronics provides an appropriate signal to the inverter and ballast to extinguish the lamps. This stabilizes the system response by preventing the lamps from turning on and off in a rapid and annoying fashion. The control electronics adjust the lamp output to maintain the light level as constant as practicable at a target light level. The control scheme varies the lamp output between a minimum and maximum level as dictated by the ambient light provided by sources other than the lamps under control. The range of lamp output, as well as the target light level, can be selected according to the expected ambient light fluctuations in the environment where the device is installed and according to the intended use of the environment and its lighting requirements.

U.S. Pat. No. 5,894,175 issued to Berlin et al. is directed to a photo-control apparatus and circuit which uses light to regulate the operation of a load. The photo-control circuit includes two or more photocells connected in parallel that respond to ambient light and a switch that uses a bimetal element to connect the power switch to the load. When the photocells are exposed to ambient light, the resistance of the photocells decreases which results in increased current flow causing a heating resistor to dissipate additional heat. The additional heat forces the bimetal element to expand which thereby disengages the load from the source. In the absence of light, the resistance of the photocells increases, limiting the heat and allowing the switch to remain in a closed position. This couples the load to the source. FIG. 3 illustrates a prior art version of a photo-control apparatus which embodies a single photocell.

U.S. Pat. No. 6,294,874 issued to Rudolph et al. is directed to a ceiling fan assembly that includes a light-sensitive circuit for controlling an illumination level of a light as a function of an ambient illumination level surrounding the ceiling fan assembly by selectively controlling or fixing a conduction phase angle of an AC power signal provided to the light. The light-sensitive circuit includes a photocell that is responsive to the ambient illumination level. The light-sensitive circuit operates as a function of ambient illumination surrounding the ceiling fan assembly. The light-sensitive circuit illuminates at selective percentages of a fully-on illumination level as a function of an ambient light level; illuminates at a fully-on illumination level or a fully-off illumination level regardless of the ambient light level; and avoids flicker from the light operating at low levels of illumination.

A paper entitled "Characterizing daylight photosensor system performance to help overcome market barriers" by A. Bierman et al, published in the Journal of Illuminating Engineering Society (Winter 2000) discloses theoretical underpinnings for a daylight photo-sensor system that could control illumination efficiently by balancing the use of daylight and electric light and would offer occupants a satisfactorily illuminated working environment in office buildings. The article discloses that "[t]he control algorithm is the most important functional element of the photo-sensor system," see page 108, and that it "dominates the performance of the photo-sensor system," see page 110. According to the article, the main division of separate functions is between the optical and electrical characteristics. The optical functions serve two main purposes: (1) they collect ambient radiation and direct it onto the photocell, where it is converted into an electrical signal; and (2) they make the response of the photo-sensor wavelength selective in some way so that it can be related to photometric quantities. The electrical function modifies the photocell signal to produce the desired control-algorithm response. The control algorithm can be further divided into a steady-state response and a temporal response. The link between the optical response functions and the control algorithm can be made by reporting the control algorithm as a function of photo-sensor illuminance for a specific wavelength and incident direction.

U.S. Pat. No. 4,461,977 issued to Pierpoint et al. discloses a zone lighting controller that controls lights by integrating external control signals for daylight and occupancy with a local override function. The daylight signal is from a master photoelectric control and the occupancy signal is from a time clock or electronic occupancy sensor. The lighting controller turns the lights off if there is either sufficient daylight or if the zone is vacant and turns the lights on if there is insufficient daylight and the room is occupied. The override switch allows the light to be on for a preset period of time regardless of the control signals from the daylight and occupancy sensors.

A paper entitled "A comparison of photosensor-controlled electronic dimming systems in a small office" by R. Mistrick et al., published in the Journal of the Illuminating Engineering Society (Winter 2000) analyzed six commercially available photo-sensors and their associated control algorithms. Although the study addressed the ability of the sensors to be optimally fit to a series of daylight conditions, it did not address the ability of the sensors to be appropriately calibrated under real room conditions. The article notes that "[c]alibration presents a potential problem since the actual performance of a control system is based on a setting that is derived at a single daylight condition. If this condition is not carefully selected, the resulting performance may be different than desired." See page 71.

U.S. Pat. No. 4,021,679 issued to Bolle et al. discloses a method and apparatus for automatically switching artificial light. The light is turned on by a person entering the area and reflecting an ultrasonic wave pattern toward a receiver. The light is turned off by a person moving into contactless proximity of a capacitance comparison circuit which uses the capacitance of the human body as one of the circuit elements. The system uses a photocell to operate at different levels of sensitivity, depending upon the existing available light in the area.

U.S. Pat. No. 4,523,132 issued to Christiansen et al. relates to a lighting system having a plurality of individual light points that can be controlled by a central switch element. The central switch element includes a light sensor and a dimness switch. Manually operated switches may be used to override the central switch.

U.S. Pat. No. 6,003,160 issued to Seidle et al. discloses an automatic self-illuminating toilet lid. The toilet lid has a light source that can automatically be switched on and off using a gravity switch when the toilet lid is raised and lowered. A light sensor opens a circuit when room light or daylight is detected, thus preventing batteries from lighting the lamp.

U.S. Pat. No. 6,422,714 issued to Hubbell discloses an illuminated outdoor sign with two photo-sensors that control when the sign is illuminated. One photo-sensor responds to ambient light level. It is shielded from artificial light such as street lights and lights from vehicles. The second photo-sensor responds to a vehicle's headlights. It is shielded from ambient light and other sources of artificial light. When both photo-sensors are on, a lamp in the sign is illuminated.

To overcome the shortcomings of prior art photosensor systems, a new photosensor switch is provided. An object of the present invention is to provide improved building end-use efficiency. A related object is to significantly reduce the lighting energy used in commercial buildings with significant daylight contribution either through windows or skylights. Another object is to reduce peak load requirement.

It is still another object of the present invention to have a system that is easy to install, requiring no additional runs of wire. An additional object is to use the system with existing wiring within a lighting fixture. Yet another object of this invention is to use the invention with conventional ballast technologies, including instant start ballasts, without the need to replace ballast. A further object of the invention is have a system that is self-commissioning and will not require a lighting specialist. It is yet a further object of the invention that the system will individually control only one lighting fixture, which will be turned off only if sufficient daylight is available in the area where that particular fixture is installed. It is yet a further object of the invention to alleviate the problem of having uneven light distribution within a space.

SUMMARY OF THE INVENTION

To achieve these and other objects, and in view of its purposes, the present invention provides a control system for controlling an electric luminaire disposed in an indoor space. The control system has a programmable switch for switching the luminaire between on and off conditions. It also has a photosensor for sensing light at multiple locations within the space and a processor for receiving signals from the photosensor and controlling the switch responsive to the signals. The processor is configured perform a number of calculations. The processor calculates a first plurality of sensor signal values when the photosensor is at a first location within the space; it calculates a second plurality of sensor signal values when the photosensor is at a second location within the space; it calculates a first threshold value for switching on the luminaire when light in the space is less than a first value; and it calculates a second threshold value for switching off the luminaire when light in the space is greater than a second value.

The present invention also defines a method of commissioning a switch to control an electric luminaire in an indoor space responsive to signals from a photosensor. A first plurality of sensor signal values is calculated when the photosensor is disposed at a first location within the space. A second plurality of sensor signal values is calculated when the photosensor is disposed at a second location within the space. A first threshold value is calculated for switching on the luminaire when light in the space is less than a first value. A second threshold value is calculated for switching off the luminaire when light in the space is greater than a second value.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
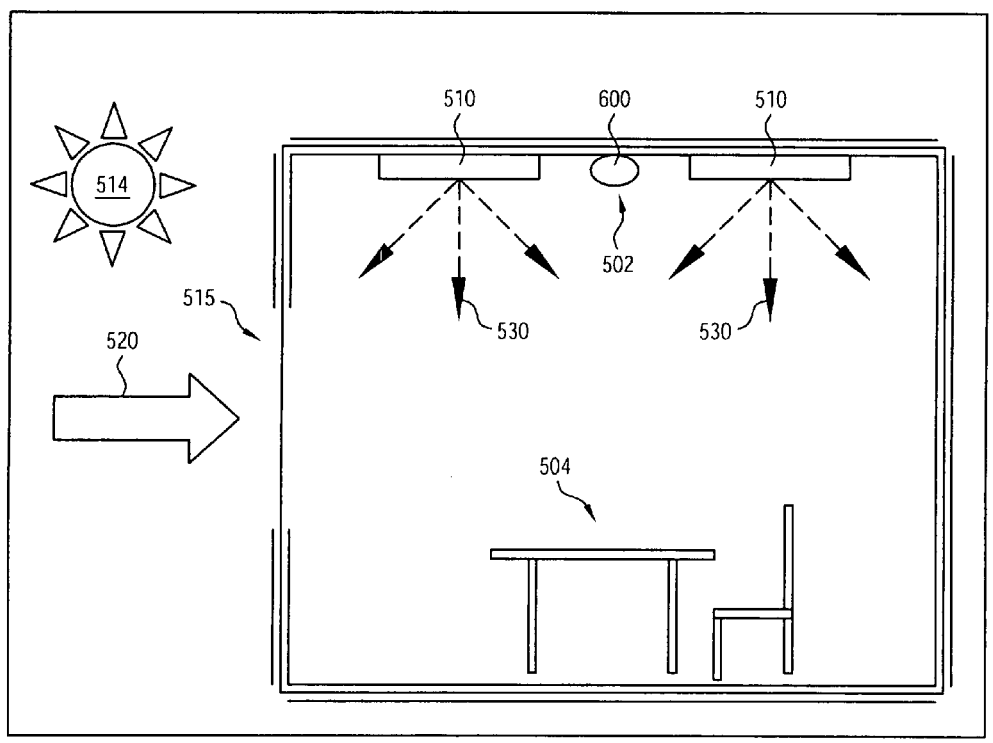
FIG. 1 is a diagram of a windowed office or work space that can benefit from the present invention.

Referring now to the drawing, in which like reference numbers refer to like elements throughout the various figures that comprise the drawing, FIG. 1 shows a typical work space 501. Typical work space 501 has windows 515 which allow daylight 520 from the sun 514 and reflected daylight from the sky and ground to enter the work space 501. This daylight 520 could be used to replace some or all of the electric light 530 provided by one or more electrical lighting fixtures 510 or luminaires to provide illumination of a task location 504 in the work space 501. To control the amount of illumination provided by lighting fixtures 510, a sensor module 600 may be incorporated in a lighting control system to dim or switch off the lighting fixtures 510 in response to the illumination available in the work space 501. The most convenient conventional location for the sensor module 600 is at an operational ceiling sensor location 502, typically on the ceiling or is high on a wall of the work space 501.

The inventors have developed equations upon which they have based their apparatus and method. Following is the derivation of the equations for maintaining constant task light level from remote sensor measurements when two light sources/distributions are present.

The electric light and daylight task/sensor ratios are defined as follows:

$$E_R = \frac{T_E}{S_E}$$

$$D_R = \frac{T_D}{S_D}$$

where $T_E$ is the Task electric light level, $T_D$ is the task daylight light level, $S_E$ is the sensor signal due to electric light, and $S_D$ is the sensor signal due to daylight.

The sensor, S, responds to a combination of daylight and electric light. The amount of electric light as measured by the sensor, $S_E$, needed to maintain a constant task light level is needed for appropriate control of the electric lighting.

$$S_E = S - S_D$$

Separating the contributions of daylight and electric light and using the task/sensor ratios $S_E$ is expressed in terms of the total sensor signal.

This last equation gives the sensor signal from electric light that is required to maintain constant task illumination. $S_E$ is in terms of the measured sensor signal, from both electric light and daylight, the ratios determined during commissioning, and the desired task light level. This equation may be used with switching systems to set the correct electric light output.

For on/off control, only two threshold values for the sensor signal, S, are needed; the value at which the electric lights are switched off, and when off, the value at which the electric lights are switched on.

Switching Off the Lights

The task light level when the electric lights are switched off is desirably at least twice the light level when only the electric lights are on so that when the electric lights are switched off the task light level from daylight will be equal to or greater than that from the electric lights alone.

Switching on the Lights

The electric lights are desirably switched on whenever the task light level falls below the light level produced by only the electric lights. When the electric lights come on, the task light level will be nearly equal to twice the electric light only light level.

In equation form:

$$T_{OFF} = 2T_{Eo} = T_{Eo} + T_{Doff}$$

where $T_{Doff}$ is the daylight contribution which equals the electric light level at this particular condition and $T_{EO}$ is the electric light component at the task. The sensor is not at the task so $T_{OFF}$ must be expressed in terms of what the sensor, located on the ceiling, say, is measuring. Since the daylight and electric light contributions are separated, the task/sensor ratios can be used to determine the threshold sensor measurements.

$$S_{OFF} = \frac{T_{Eo}}{E_R} + \frac{T_{Doff}}{D_R}$$

$$S_{OFF} = \frac{T_{Eo}}{E_R} + \frac{T_{Eo}}{D_R}$$

$$S_{OFF} = T_{Eo}\left(\frac{1}{D_R} + \frac{1}{E_R}\right)$$

$$S_{ON} = \frac{T_{Eo}}{D_R}$$

The daylight task/sensor ratio is used in the equation for the threshold for switching on the electric lights because only daylight is present when that threshold is determined.

The electric lights are switched off when the sensor measures a level greater than $S_{OFF}$, and switched on when the sensor measures a level less than $S_{ON}$. To avoid frequent switching when the daylight level hovers near the threshold values the $S_{OFF}$ threshold may be pushed higher, a time delay criteria may be added, or both measures may be used for maximum guarding against frequent, annoying switching.

Commissioning

A commissioning procedure is required in order to determine the task/sensor ratios and the task light level provided by only the electric lighting. The following four measurements are obtained.

1. Task location, lights off (A)
2. Task location, lights on (B)

3. Sensor location, lights off (C)
4. Sensor location, lights on (D)

From these measurements $T_D$=A, $S_D$=C, $T_E$=B−A, and $S_E$=D−C. In terms of the commissioning constants A, B, C, and D, the switching thresholds, $S_{ON}$ $$S_{OFF} = \frac{BC - 2AC + AD}{A}$$

and $S_{OFF}$ are:

$$S_{ON} = \frac{BC - AC}{A}$$

Figure 2:
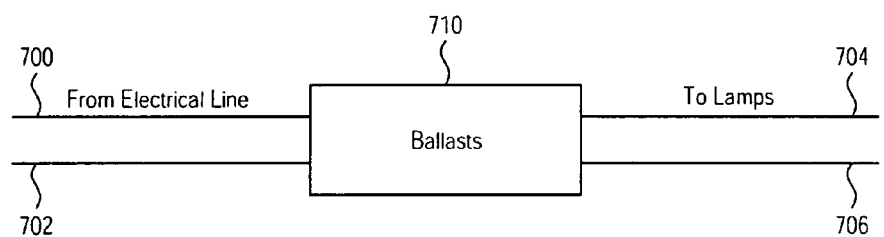
FIG. 2 is a circuit diagram illustrating a conventional circuit supplying electric power to lamps.

FIG. 2 shows a conventional circuit illustrating how electric power is supplied to lamps. Electricity is supplied from input electric lines 700, 702 to ballasts 710. Electricity then flow to lamps (not shown) from ballasts 710 through output electric lines 704, 706.

Figure 3:
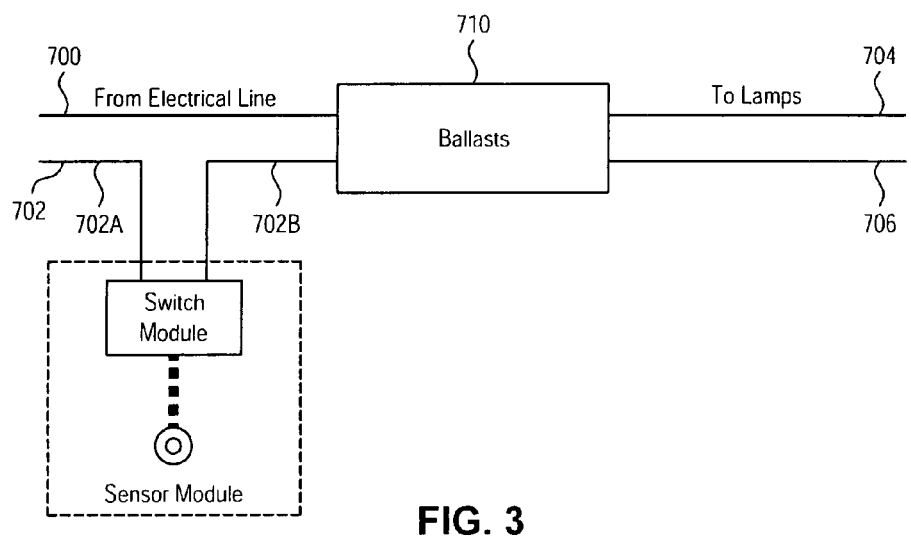
FIG. 3 is a circuit diagram illustrating how electric power is supplied to lamps using the present invention.

FIG. 3 shows a circuit illustrating how electric power is supplied to lamps using the present invention. Electricity is still supplied from electrical lines 700, 702 to lamps (not shown) through ballasts 710. However, a self-commissioning switch module 620 is placed within line 702 before the ballasts in order to switch the ballasts off and on in accordance with an algorithm and in accordance with the amount of light sensed by a sensor module 600. In an exemplary embodiment, in order to insert switch module 620, electric line 702 may be cut, forming lines 702A and 702B. Line 702A is connected to the input side of switch module 620 and line 702B is connected to the output side of switch module 620. Ballasts 710 illustrated in FIG. 3 may be the same conventional ballast technology illustrated in FIG. 2. Accordingly, no ballast replacement is required. As shown in FIG. 3, the invention has two main parts: the switch module 620 and the sensor module 600 coupled to each other over line 610. The switch module may be installed directly onto the ballast lead wire in an existing fluorescent lighting fixtures or housing. In an alternative embodiment, the switch module may clip onto the ballast lead wire in an existing fluorescent lighting fixture. In another alternative embodiment, the switch module may be used with a luminaire other than a fluorescent lighting fixture. Either of these embodiments may be used during retrofit installation. In yet another alternative embodiment, the switch module may be wired directly to the lead wire on a new fixture.

Figure 5:
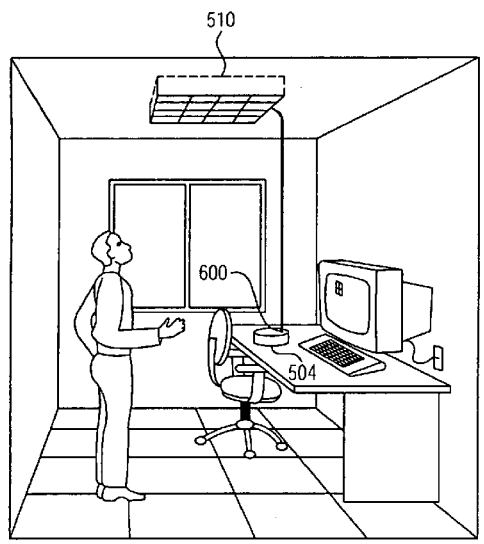
FIG. 5 illustrates an operational sensor location in accordance with an exemplary embodiment of the invention.
Figure 6:
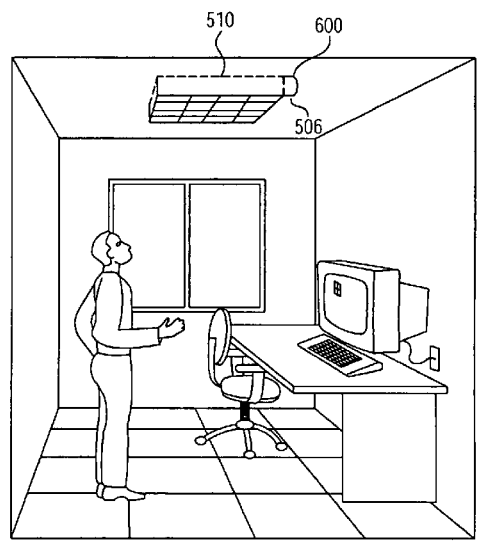
FIG. 6 illustrates another operational sensor location in accordance with an exemplary embodiment of the invention.

The switch module incorporates electronic circuitry and a microprocessor into a small, lightweight housing that may easily fit into the ballast channel in a fluorescent lighting fixture. The switch module may also have a small transformer to power up the sensor module 600 which contains a photocell. Details of the switch module, the sensor module, and how they interact with a lamp are presented in detail below. Generally, sensor module 600 generates a sensor signal responsive to the illumination level at sensor module 600. Sensor module 600 is movably mounted in an operational sensor location. As shown in FIG. 1, an operational ceiling sensor location 502 may be between lamps 510. As shown in FIG. 5, an operational sensor location may be at task sensor location 504. As shown in FIG. 6, an operational sensor location may be at operational lamp location 506. In an exemplary embodiment, sensor module 600 is moved between operational sensor locations at task location 504 and at lamp location 506.

Figure 4:
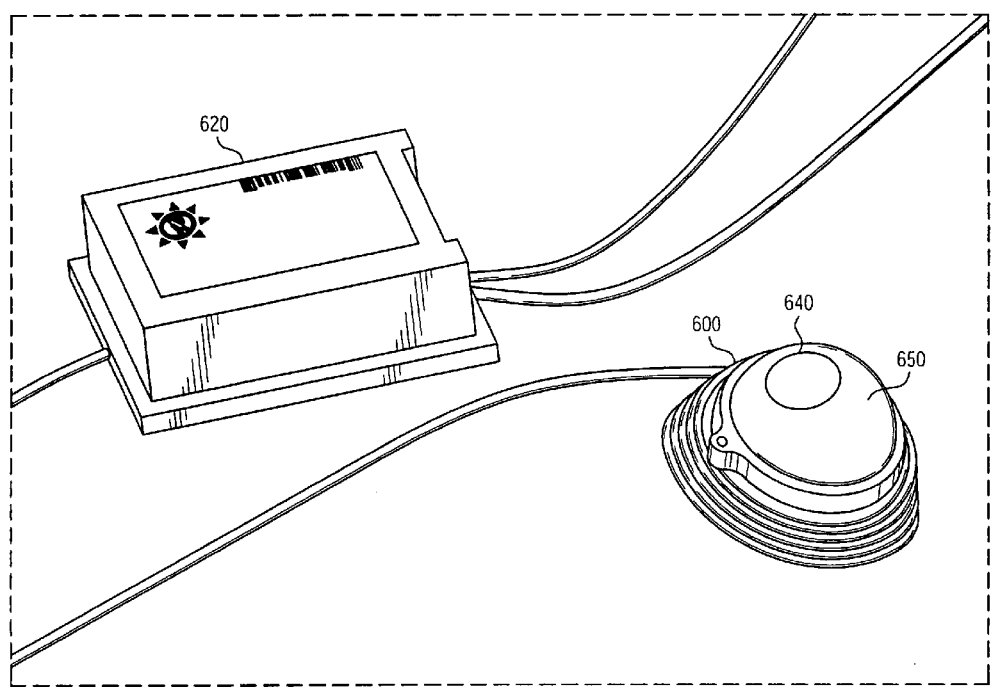
FIG. 4 is a photograph of a switch module and a sensor module in accordance with an exemplary embodiment of the invention.

FIG. 4 is a photograph of an exemplary embodiment of a switch module 620 and an exemplary embodiment of a sensor module 600. Sensor module 600 includes a photosensor 640 within in a rotatable ball 650. Rotatable ball 650 provides flexibility in placement of the sensor module so that it can be adjusted to point to the source of light regardless of where it is placed in a room. For example, if the sensor module is placed on the ceiling, the photosensor might point straight downward. On the other hand, if the sensor module is placed on a wall, the sensor module would have to be rotated to enable the photosensor to point downward. Rotatable ball 650 may allow the user to point the photosensor in the desired direction.

Figure 7:
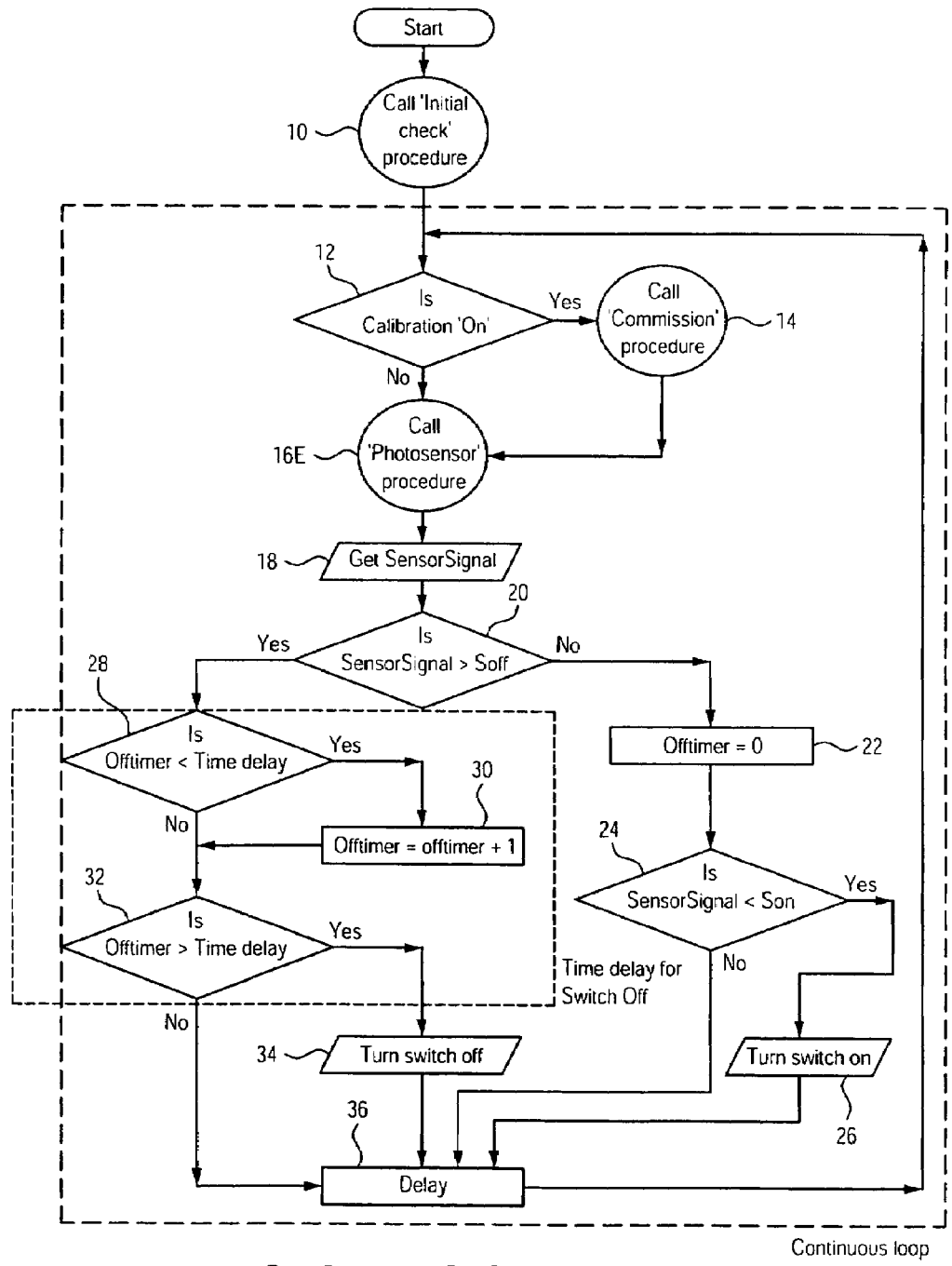
FIG. 7 is a flow chart illustrating the main algorithm of the switch in accordance with an exemplary embodiment of the invention.
Figure 8:
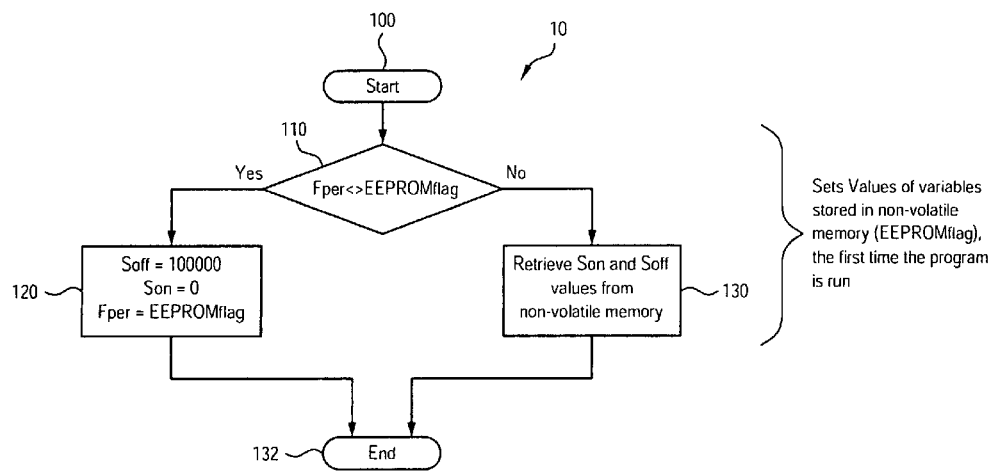
FIG. 8 is a flow chart illustrating an initial check procedure in accordance with an exemplary embodiment of the invention.

FIG. 7 is a flow chart illustrating the main algorithm of the switch of the present invention. When beginning the process the first time, the switch is placed at a particular location in a particular room, and step 10 initiates the call initial check procedure. A purpose of initial check procedure 10 is to determine if the program for the specific light is running for the first time. Another purpose of the initial check procedure 10 is to set default settings that are used for the operation of the switch before the program algorithm runs the system through the commissioning procedure. The initial check procedure 10 is illustrated by the flow chart shown in FIG. 8.

The initial check procedure 10 begins at step 100 when the light is first turned on. At that point, initial check procedure 10 determines if the program is running for the first time. Decision Block 110 determines if the first persistent byte $F_{per}$ is not equal to the EEPROMflag stored in the microprocessor. If $F_{per}$ is not equal to EEPROMflag, the initial check procedure has not been run previously and the answer to Decision Block 110 is "Yes." If $F_{per}$ is equal to EEPROMflag, the answer to Decision Block 110 is "No," meaning that the initial check procedure 10 has been run previously. If the answer to Decision Block 110 is "Yes," Step 120 of the program sets $S_{off}$ equal to 100,000 and sets $S_{on}$ equal to 0. $S_{off}$ is set to such a high number so that the light never automatically turn off. That is, the light is always controlled by the algorithm-controlled switch. $S_{on}$ is set to 0 so that the lights always switch on, regardless of the photosensor signal. Accordingly, when the system is run for the first time, the light will be switched on as the system runs through the initial check procedure. These initial values of $S_{on}$ and $S_{off}$ are stored in non-volatile memory EEPROMflag the first time the program is run and the value of $F_{per}$ is set to equal the value of EEPROMflag.

When the light is turned off for the day, the last $S_{off}$ and $S_{on}$ sensor signals are stored in the non-volatile memory EEPROMflag. When the light is turned on, and the initial check procedure is restarted, the answer to Decision Block 110 may be "No" because the initial check procedure has been run previously and $F_{per}$ is equal to EEPROMflag. As a result, the answer to Decision Block 110 is "No" and resulting in Step 130 being run. When Step 130 is run, the program retrieves the values of $S_{off}$ and $S_{on}$ that had been stored in non-volatile memory EEPROMflag when the light had been turned off. More specifically, the sensor signal for $S_{off}$ and the sensor signal for $S_{on}$ are each retrieved from the non-volatile memory. After Step 120 has been performed when the system is first turned on, the initial check procedure ends at Step 132. Similarly, after Step 130 has been performed when it is appropriate to perform Step 130, the initial check procedure ends at Step 132.

After the main algorithm completes initial check procedure 10, it proceeds to a repeating series of steps shown within dotted box 20 in FIG. 7. In an exemplary embodiment, these repeating steps may be performed every 0.5 second. In other embodiments, the repetition rate of the steps within box 20 may be varied depending upon the desired speed of response of the system. Accordingly, the repetition rate may be higher if it is important to immediately switch the lights on in response to changing conditions and may be lower if immediacy is not needed.

Figure 11A:
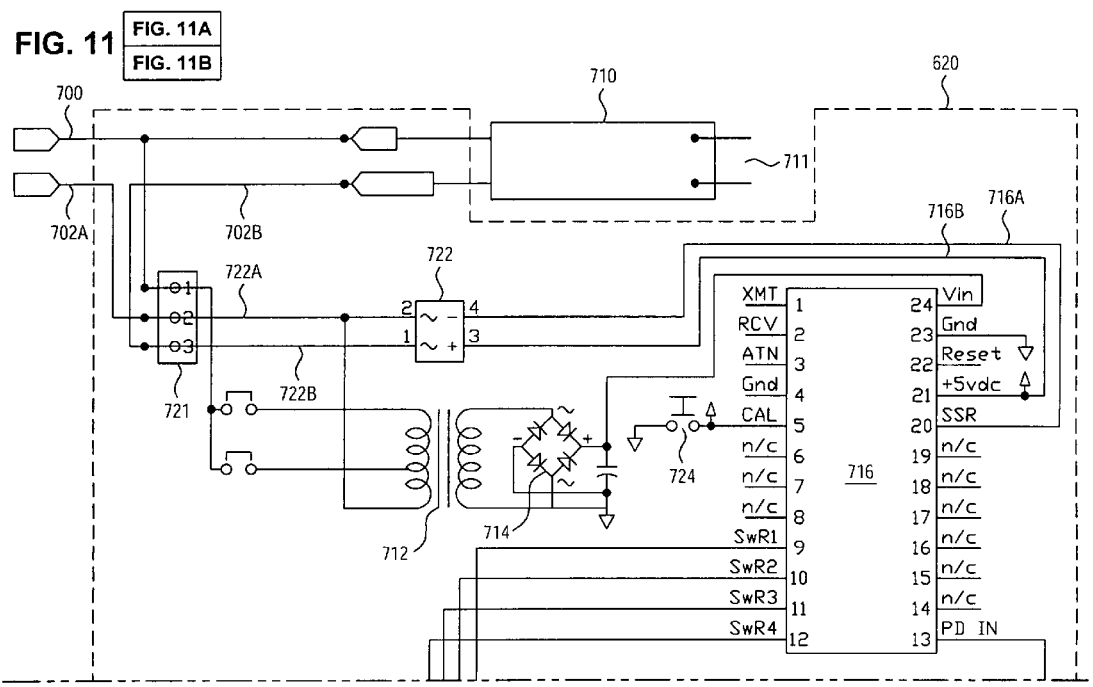
FIG. 11 is a circuit diagram in accordance with an exemplary embodiment of the invention.
Figure 11B:
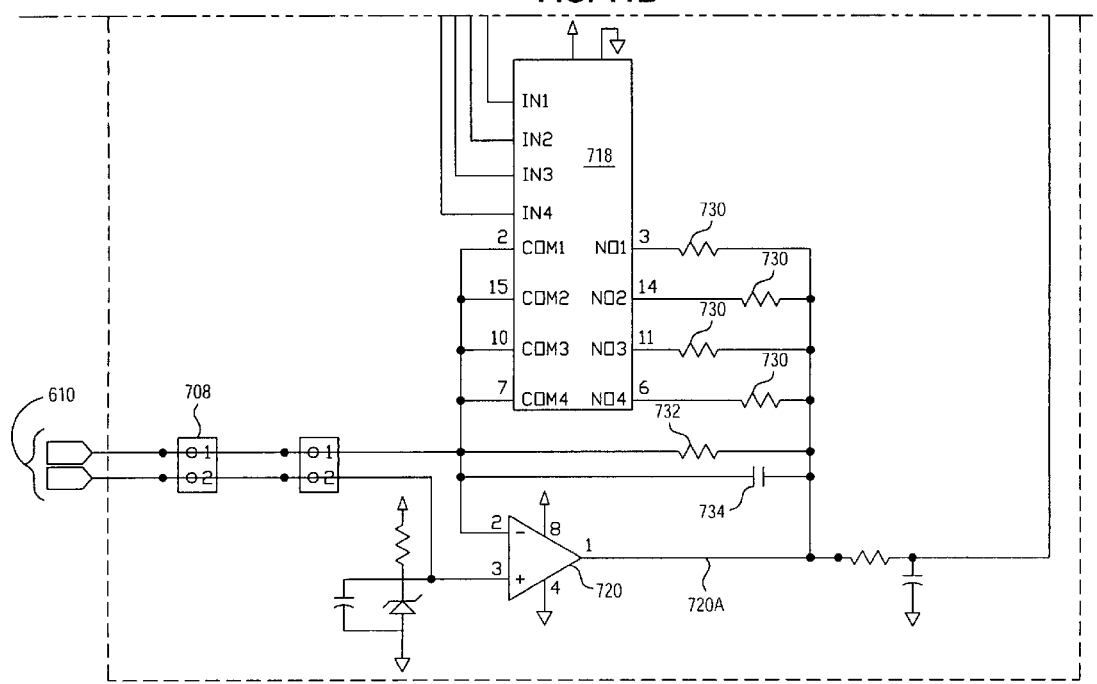

Before the main algorithm and the various sub-algorithms are explained, the underlying circuit will be explained. With the exception of calibration switch 724, FIG. 11 is a circuit diagram of the components contained within switch module 620, their connection to sensor module 600 over coupling 610, their connection to power lines 700, 702, and their connection to ballasts 710, also shown in FIG. 3. A calibration switch 724 is provided for operator input during the commissioning, and a commissioning procedure is programmed into switch module 620. Although calibration switch 724 is connected to the switch module circuitry, calibration switch 724 is not positioned within switch module 620. Instead, it is positioned outside switch module 620 as explained in more detail below.

Referring to FIG. 11, a wiring connector 708 may couple switch module 620 to sensor module 600 (not shown in FIG. 11) via coupling lines 610. Wiring connector 708 is part of switch module 620 that is physically and electrically connected to the luminaire housing. Switch module 620 may be inserted between the input current received from power lines 700, 702 and ballasts 710 by cutting power line 702A and placing switch module 620 in line 702A. Switch module 620 may include a relay switch 722. In an exemplary embodiment, relay switch 722 may be an electronic relay switch. In an alternative embodiment, relay switch 722 may be a mechanical relay switch. Relay switch 722 may open or close the circuit between input power line 702A and ballasts 710. When relay switch 722 is closed, current may flow from input power line 702A through connector 721, line 722A, relay switch 722, line 722B, connector 721, and line 702B. When relay switch 722 is open, current may not flow to switch module 620 or to sensor module 600.

Figure 12:
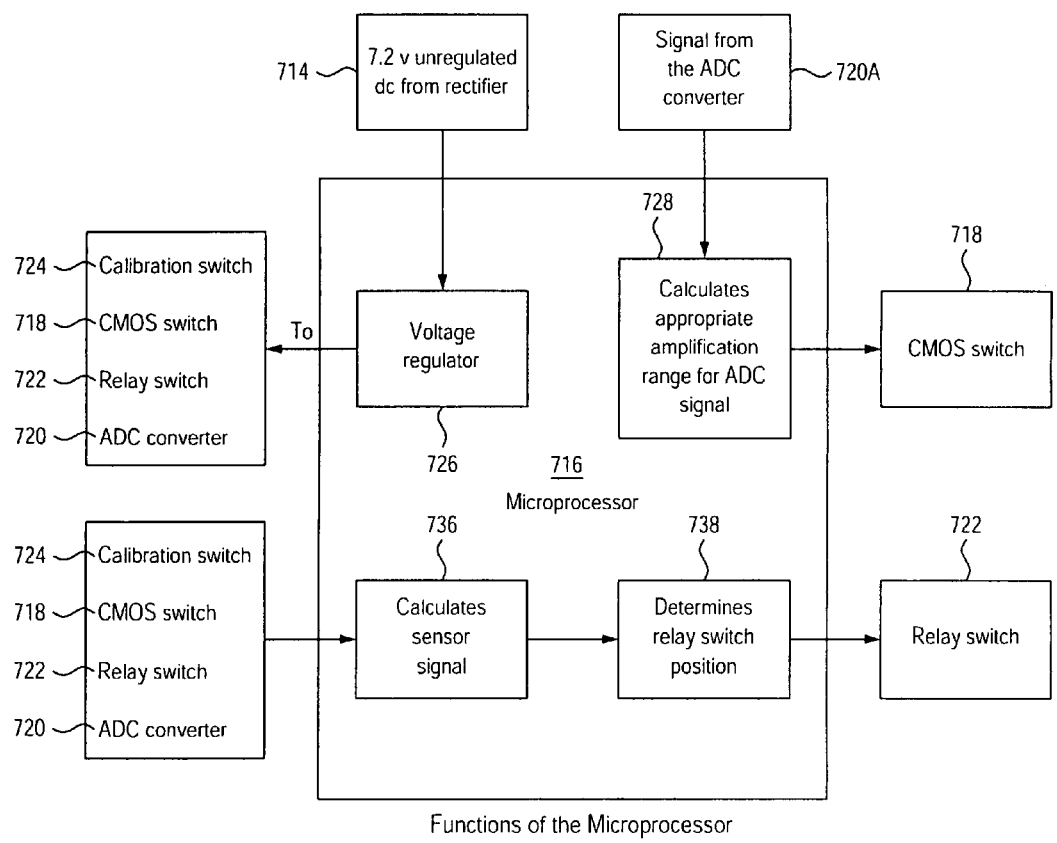
FIG. 12 is a block diagram illustrating the functions that may be performed by a microprocessor in accordance with an exemplary embodiment of the invention.

Also coupled to input power lines 700, 702 is a transformer 712 which may convert the line voltage to 7.2 volts. Rectifier 714 may convert the voltage output from transformer 712 into 7.2 volts DC. Referring to FIG. 12, the 7.2 volts DC at the output of rectifier 714 may be converted to a regulated 5 volts DC by a voltage regulator 726 within microprocessor 716. The regulated 5 volts DC output from microprocessor 716 powers various components including CMOS analog switch 718, analog to digital converter and amplifier 720, and relay switch 722.

Five volts may also be transmitted from voltage regulator 726 to calibration switch 724 via an internal resistor connection (not shown). In an exemplary embodiment, calibration switch 724 is open, allowing the 5 volts to be applied to the CAL pin in microprocessor 716. When calibration switch 724 is pushed, it grounds the 5 volts thereby reducing the 5 volt signal at the CAL pin to ground potential. Grounding the 5 volts from the CAL pin causes microprocessor 716 to begin the main algorithm, including the commissioning procedure and the photosensor procedure. In an alternative embodiment, the circuit may be designed so that the algorithm begins when the microprocessor receives a 5 volt signal when the calibration switch is pushed.

Lines 610 may be connected to sensor module 600 which may include a photodiode or other light sensing element that is able to convert light into an electrical signal. The electrical signal from sensor module 600 through lines 610 may be amplified by analog to digital converter (ADC) and amplifier 720. Referring to FIGS. 11 and 12, the signal 720A from the output of A/D converter and amplifier 720 is an amplified digitalized signal from sensor module 600. Output signal 720A may be transmitted to microprocessor 716 which contains a calculator 728 to calculate an appropriate amplification range for output signal 720A. That is, the gain of ADC and amplifier 720 can be controlled by an auto-ranging circuit in which ADC and amplifier 720 switches various complementary metal-oxide-semiconductor (CMOS) gates into the auto-ranging circuit depending on the amplitude of amplified sensor signal 720A. The various CMOS gates (which can be located, for example, on CMOS switch 718) are connected at their outputs to a series of resistors 730 having graduated resistance values such that the selected resistor, in combination with resistor 732 and capacitor 734, adjusts the gain of ADC and amplifier 720 to accommodate one of a group of ranges which may be, for example, graduated in multiples of ten. The microprocessor 716 then transmits the calculated amplification back to the CMOS switch 718.

Using the output from CMOS switch 718, along with information signals from calibration switch 724, CMOS switch 718, relay switch 722, and ADC converter 720, another calculator 736 in microprocessor calculates sensor signals using the equations stated above. Based upon the nature of the sensor signals, microprocessor 716 determines, at Block 738, the position of relay switch 722. That is, it determines if relay switch 722 should be in the open position or in the closed position and sends a signal to relay switch 722 which may either open or close it. When relay switch 722 is closed, current may flow to ballasts 710, thereby turning on the luminaire. When relay switch 722 is open, no current may flow to ballasts 710 and the luminaire may be turned off.

Software in the microprocessor contains the main algorithm explained below. One or more of the functions of the algorithm may be implemented in the software that controls the microprocessor. This software may be embedded in a machine-readable medium having an encoded program code. The microprocessor may execute the program code. The machine-readable medium may be a magnetic or optical disk, a memory-card or an audio frequency, radio-frequency, or optical carrier wave.

After amplification of the sensor signals, the microprocessor obtains the sensor signal values for different conditions defined by the algorithm and performs a number of calculations from the sensor signal values. The microprocessor calculates the sensor signal values and sensor signal threshold values. Based on the calculations, the microprocessor determines whether to close or open relay switch 722 which opens or closes the circuit to ballasts 710 and the luminaire coupled to the ballasts.

Referring to FIG. 7, the first step in the main algorithm after completion of initial check procedure 10 is a determination of whether calibration switch 724 is on. In an exemplary embodiment, the calibration switch 724 may be attached to sensor module 600. In another alternative embodiment, the calibration switch may be placed in any other convenient location in the room where the luminaire is located. The calibration switch is provided for operator input during the main algorithm procedure and during the commissioning procedure.

When the main algorithm is run for the first time, the calibration switch may be pushed in order to begin the commissioning procedure. Once the commissioning procedure has been completed for a specific luminaire in a specific room, at a specific location, the settings for the system may have been finalized and the calibration switch need not be pushed when the lights are turned on again.

In FIG. 7, decision block 12 determines if the calibration switch has been pushed. If the answer is "Yes," commissioning procedure 14 begins. In an exemplary embodiment, the calibration switch would be "on" in step 12 only if it were necessary to run the commissioning procedure 14. That is, the commissioning procedure may need to be run only the first time the invention is applied to a luminaire at a particular location in a particular room with a particular configuration of walls and furniture. As long as the configuration of the room does not change, the commissioning procedure may not need to be run again. If, however, the configuration of the room is changed, the user may want to call the commissioning procedure after the configuration of the room has been changed. If the answer to decision block 12 is "Yes," the commissioning procedure in step 14 may be performed followed by the photosensor procedure in step 16E. On the other hand, if the answer to decision block 12 is "No," the calibration switch has not been pushed because, for example, the commissioning procedure may have previously been performed. Under that circumstance, the process may proceed directly to photosensor procedure step 16E without calling the commissioning procedure.

Figure 9:
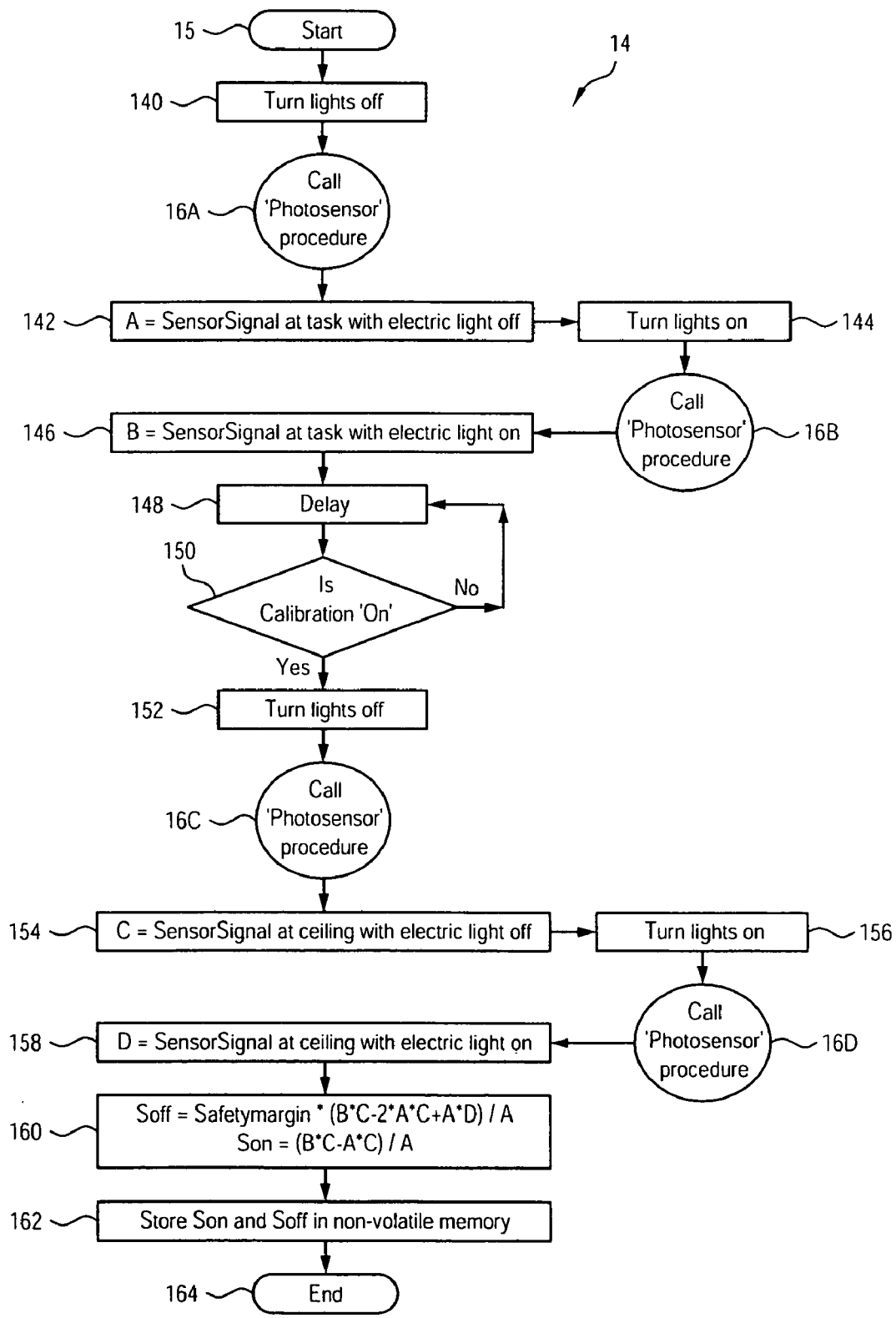
FIG. 9 is a flow chart illustrating the commissioning procedure in accordance with an exemplary embodiment of the invention.

An exemplary embodiment of commissioning procedure 14 is shown in FIG. 9. It is a self-commissioning procedure. "Self-commissioning" means that the switch performs all measurements and calculations required to determine the illumination levels for turning a luminaire off and on in order to complete the commissioning procedure. A closed-loop control algorithm is used in the present invention. The algorithm determines and controls the on and off points of the luminaire. The commissioning procedure is programmed into the switch module to provide quick and easy commissioning. The switch module performs the necessary measurements and calculations and may prompt the operator to move the photosensor module to sense to illumination at places in the room, for example at a task location and at a ceiling location.

To commission switch module 620, an operator initiates the programmed commissioning procedure by positioning photosensor module 600 at task location 504 as shown in FIG. 5 and pressing calibration button 724. The start 15 of the commissioning procedure is then triggered by a "Yes" response to decision block 12 in FIG. 7. The first step in the commissioning procedure may be Step 140 which turns off the light to which the switch module 620 and sensor module 600 are coupled. Microprocessor 716 causes the luminaire to be turned off by opening relay switch 722. The next step in commission procedure 14 is Step 16A, calling photosensor procedure 16A, which will be described below in connection with FIG. 10. FIG. 9 shows that a photosensor procedure is run a number of times during the commissioning procedure. In an exemplary embodiment, all of the photosensor procedures may be identical. Therefore, in order to distinguish among the various photosensor procedures in the exemplary embodiment shown in FIG. 9, they are identified as 16A, 16B, 16C, and 16D. In an alternative embodiment, all of the photosensor procedures may not be identical.

Figure 10:
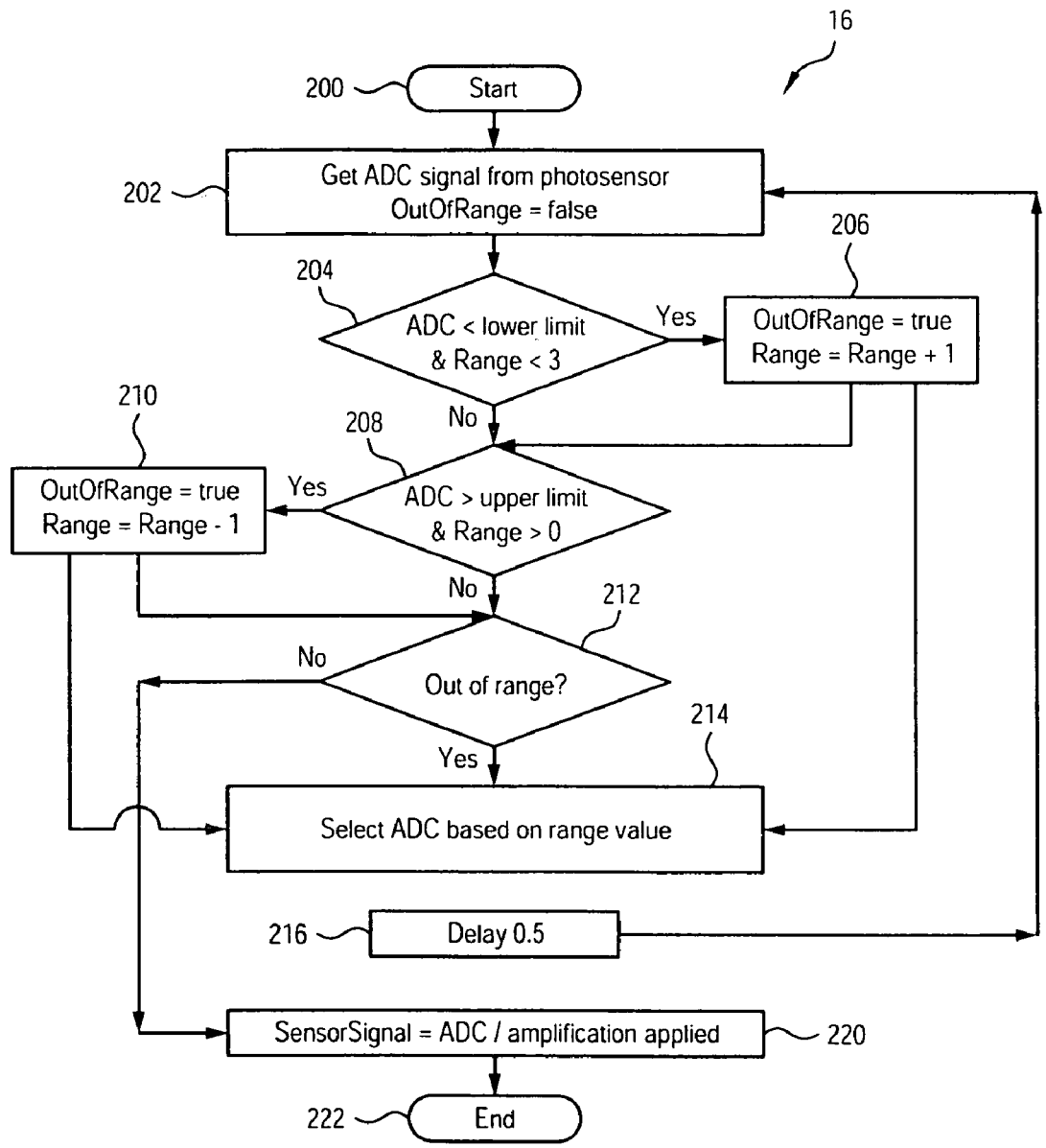
FIG. 10 is a flow chart illustrating the photosensor procedure in accordance with an exemplary embodiment of the invention.

FIG. 10 illustrates an exemplary embodiment of photosensor procedure 16, including photosensor procedure 16A. Generally, in Step 202, the position of the photosensor in sensor module 600 may either be at task location 504 or at operational lamp sensor location 506 in that the purpose of Step 16A is to calibrate the signal 720A from ADC and amplifier 720. When the photosensor module is at the task location, the system calculates a first plurality of sensor signal values. When the photosensor module is at another location, for example at a ceiling location, the system calculates a second plurality of sensor signal values. After the first and second plurality of sensor signal values have been calculated, the system calculates a first sensor signal threshold value for switching on the luminaire and calculates a second sensor signal threshold value for switching off the luminaire.

In this part of the process, the luminaire is turned off in accordance with Step 140. Therefore, the photosensor module may be sensing only uncontrolled daylight. Signal 720A is transmitted to microprocessor 716 (shown in FIG. 11) which, in Step 202, determines if the signal is within or outside of a range that is usable by ADC and amplifier 720. Initially, the system assumes signal 720A is within the range by assigning out of Range equal to "false." That is, a "false" setting means signal 720A is not out of range and, conversely, that it is within range. At this point, the system has automatically set the range equal to 1, in accordance with the system's initial assumption that signal 720A is within range. Then, the system determines if the value of signal 720A is equal or greater than the lower limit of the range and then determines if the value of signal 720A is equal to or less than the upper limit of the range.

In an exemplary embodiment, there may be four possible ranges: 0, 1, 2, and 3, all of which may be relative values. In an alternative embodiment, a different number of ranges may be used and their relative values may be different. In an exemplary embodiment, the lower limit of signal 720A may be 0.293 volts when the range is less than 3. In Decision Block 204, the system determines if signal 720A is less than 0.293 volts and the range is less than 3. If the answer to Decision Block 204 is "Yes" the process proceeds to Step 206 where the system recognizes that the value of OutofRange is "true" and increases the range value by 1. This allows the microprocessor 716 to choose the appropriate combination of resistors 730, 732 in Block 214 and adjust the signal value 720A to get it within range. After the appropriate combination of resistors is chosen in Block 214, a delay of 0.5 second may be built into the system at Block 216 to enable the system to determine if the signal is greater than the upper limit.

The process may proceed to Decision Block 208 in one of two ways. First, the process may proceed to Decision Block 208 if the answer to Decision Block 204 is "No;" that is, the value of signal 720A may be within the range because it is not less than the lower limit of the range. Second, the process may proceed to Decision Block 208 after Step 206 adjusts the value of signal 720A to be within the range.

An adjustment in Block 214 also happens when the signal 720A is greater than the maximum as determined by of Decision Block 208. The purpose of Decision Block 208 is to determine if the value of signal 720A is greater than the upper limit of a range whose range is greater than 0 and, in an exemplary embodiment, whose voltage is greater than 0.792 volts. The process may reach Decision Block 208 either through Step 206 or by a "No" in Decision Block 204.

If the answer to Decision Block 208 is "yes," the process recognizes that the value of OutOfRange in Step 210 is "true" and decreases the current range value by 1. The result of Step 210 is transferred to Decision Block 212 and to Step 214. When Step 210 proceeds to Decision Block 212, Decision Block 212 recognizes that the value of signal 720A is greater than the maximum voltage and greater than the maximum range. Accordingly, the output of Decision Block 212 is "Yes" and the process proceeds to Step 214 which also receives the signal from Step 210. Based upon these two signals, Step 214 may select the appropriate combination of resistors 730, 732, and the process loops back to Step 202. At Step 202, the procedure is run again is until signal 720A is within a range between the maximum and the minimum.

When signal 720A is within the appropriate range, the answer to both Decision Blocks 204 and 208 are "No." Then, the output of Decision Block 212 may also be "No" and the system uses the value of signal 720A to calculate Sensor Signal in Step 220. The Sensor Signal in Step 220 may be calculated by dividing the value of the signal 720A by the in-range ADC value derived in Step 214. Once the Sensor Signal is determined in Step 220, the Photosensor procedure ends in Step 222. The Sensor Signal calculated in Step 220, as part of Step 16A, is one of the first plurality of Sensor Signal values when the photosensor module is a the task location.

Figure 10A:
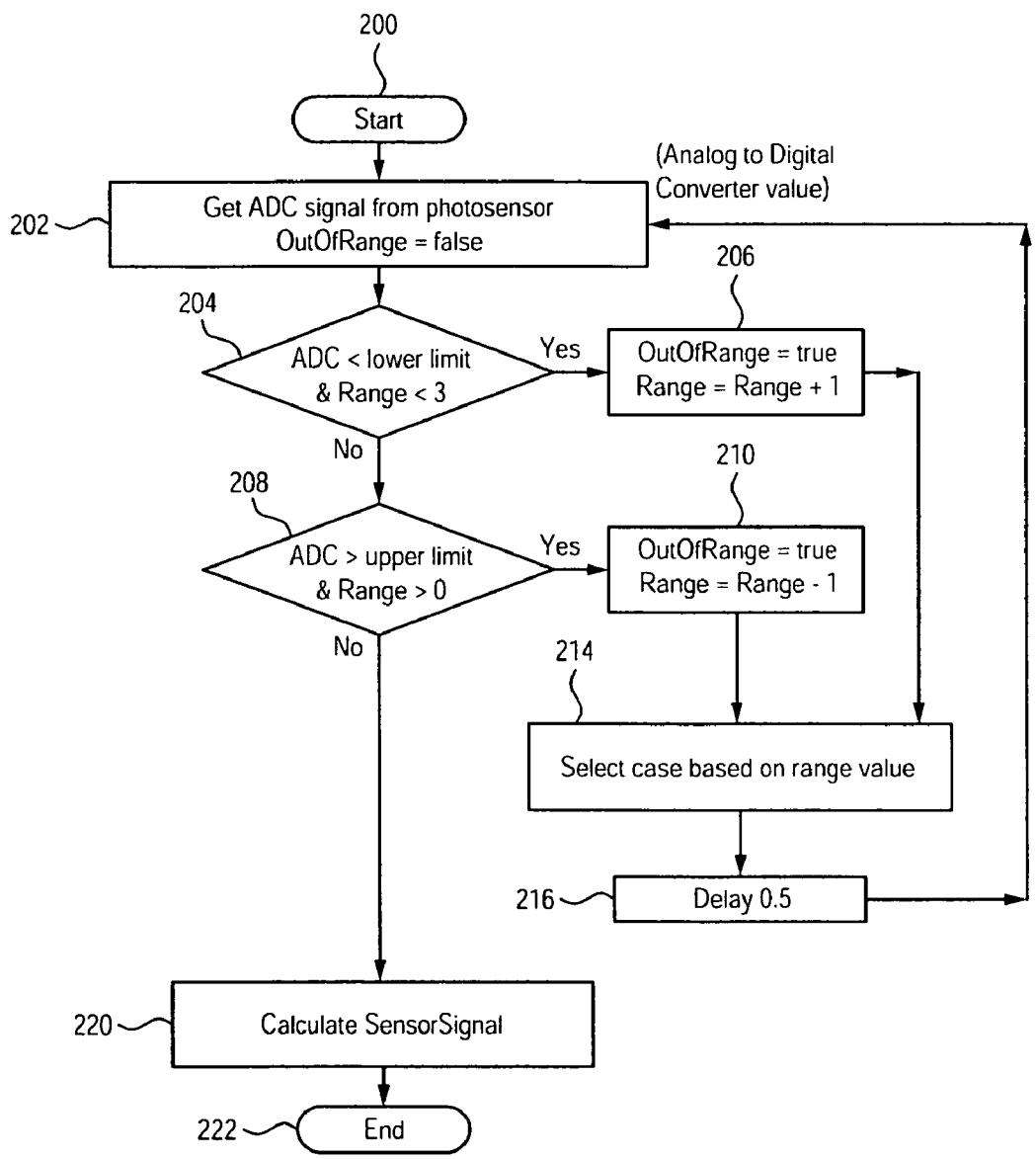
FIG. 10A is a flow chart illustrating an alternative embodiment of the photosensor procedure.

FIG. 10A illustrates an alternative embodiment of the photosensor procedure. In the alternative embodiment, Step 212 has been eliminated. If the answer to Decision Block 208 is "Yes," the process proceeds to Steps 210 which proceeds to Step 214 without the need to also provide input to Decision Block 212, which has been eliminated. After Step 214, the process proceeds to Step 216 and loops back to Step 202. If the answer to Decision Block is "No," the process may proceed directly to Step 220, eliminating the need for Decision Block 212 and Step 214. The process of Step 220 remains the same as it was in FIG. 10.

Referring back to FIG. 9, the Sensor Signal determined in Step 220 becomes signal A in Step 142; that is, signal A is the Sensor Signal when sensor module 600 is at the task level and the luminaire is turned off. Signal A is stored in microprocessor 716.

After signal A is determined, the microprocessor turns the light on in Step 144 and another photosensor procedure 16B is begun. In Step 16B, the photosensor module is receiving controlled light from the luminaire and may also be receiving uncontrolled daylight. Photosensor procedure 16B is the same procedure as discussed above with respect to FIG. 10. The entire photosensor procedure in FIG. 10 is run again, this time with the light on. Referring back to FIG. 10, the Sensor Signal 220 at the end of Step 16B may be signal B shown in Step 146. That is, signal B is the Sensor Signal with the electric light turned on. Signal B is stored in microprocessor 716. Signal B is another Sensor Signal value of the first plurality of Sensor Signal values with the photosensor module at the task location.

After a value of signal B has been determined, the process proceeds to Step 148. Step 148 delays the remainder of the Commissioning procedure to enable the user of the system to move sensor module 600 to a position at the ceiling. In an exemplary embodiment, sensor module 600 may be moved to the ceiling position shown in FIG. 6. In an alternative embodiment, sensor module 600 may be placed in a different position at the ceiling level. In yet another alternative embodiment, sensor module 600 may be placed at a position that is higher than task level 504, but not as high as the ceiling. While sensor module 600 is being moved to a ceiling location, the process loops between Step 148 and Decision Block 150. Calibration switch 724 may not be pushed again until sensor module 600 is moved to a ceiling location. The switch module may prompt the operator to move the photosensor module to sense illumination at another location in the room, for example, at a ceiling location.

As long as calibration switch 724 is not pushed again, the answer to Decision Block 150 is "No" and the process continued to loop between Step 148 and Decision Block 150. After sensor module 600 is moved to another location, such as a ceiling location, the answer to Decision Block 150 is "Yes" and the process proceeds to Step 152.

Once calibration switch 724 has been pushed again, the answer to Decision Block 150 is "Yes," microprocessor 716 turns off the electric light in Step 152, and photosensor procedure 16C is run. Photosensor procedure 16C is the same photosensor procedure described in FIG. 10. Step 220 at the end of photosensor procedure 16C provides Sensor Signal C at Step 154 in FIG. 9, which is the sensor signal at the ceiling with the electric light off. In this step, the sensor module may only be receiving uncontrolled daylight. Sensor Signal C is stored in microprocessor 716. Signal C is one of the second plurality of sensor signal values with the photosensor module disposed at another location. In this exemplary embodiment the other location may be at the ceiling. After Step 154, microprocessor 716 turns the electric light on in Step 156 and initiates photosensor procedure 16D. Photosensor procedure 16D is the same procedure described in FIG. 10. Step 220 at the end of photosensor procedure 16D provides Sensor Signal D at Step 158 that may be responsive to controlled electric light and uncontrolled daylight. Signal D is another one of the second plurality of sensor signal values with the photosensor module disposed at another location. In this exemplary embodiment, the other location is at the ceiling. Sensor Signal D is stored in microprocessor 716.

Once Sensor Signals A, B, C, and D have been determined, the process calculates first and second sensor signal threshold values for switching the luminaire on and off. That is, the commissioning procedure calculates the switching thresholds $S_{on}$ and $S_{off}$ in Step 160 using the equations described above. In an exemplary embodiment, the electric light may be switched off when the sensor module measures a level of light resulting in a combined signal that is greater than $S_{off}$ and switched on when the sensor module measure a light level resulting in a combined signal that is less than $S_{on}$. In Step 160, a Safetymargin has been added to the equations to make sure the light is turned off only when there is adequate light. In an exemplary embodiment, the value of the Safetymargin may be 1.10. Using this value may increase the total amount of controlled light and uncontrolled light in the room before the controlled luminaire is turned off. The device therefore uses the designed value for the electric lighting system as the desired light value, which can be modified by adjusting the Safetymargin. In an alternative embodiment, to avoid frequent switching when the daylight hovers near the threshold values, the $S_{off}$ threshold may be pushed even higher by 50% or more. This may be accomplished by either a pre-programmed value or by an adjustment switch on the device. In another alternative embodiment, a time delay criterion may be added to the process. Such a delay criterion could be a step added after Step 160. In yet another alternative embodiment, both measures could be used for maximum guarding against frequent, annoying switching. That is, the $S_{off}$ value may be pushed higher and a time delay may be used. In Step 162, the values of $S_{on}$ and $S_{off}$ may be stored in the non-volatile memory of microprocessor 716 and Commissioning procedure 14 ends at Step 164.

At the end of the Commissioning procedure 14, the values of $S_{on}$ and $S_{off}$ have been determined for a particular luminaire, at a particular location, in a particular room. At the end of Commissioning procedure 14, sensor module remains at the ceiling location.

Once the values of $S_{on}$ and $S_{off}$ have been set, the system is ready for use. Referring back to FIG. 7, regardless of whether the calibration switch is pushed as indicated by Decision Block 12, the process proceeds to photosensor procedure 16E which is the same as the photosensor procedure described in FIG. 10. At the end of Step 16E, the Sensor Signal 220 in FIG. 10 becomes the Sensor Signal in Step 18 in FIG. 7. In Decision Block 20, the microprocessor 716 determines if the value of the Sensor Signal is greater than $S_{off}$. If the answer is "No," the process proceeds to Step 22 where the Off timer=0. As a result of Step 22, the light may not be turned off.

After Step 22, Decision Block 24 determines if the value of Sensor Signal is less than $S_{on}$. If the value of the Sensor Signal is less than $S_{on}$, the answer to Decision Block 24 is "Yes" and in Step 26 microprocessor 26 turns on the light by closing switch 722. Closing switch 722 allows current to flow to ballasts 710 from input electrical line 700. Once the microprocessor turns on the light in Step 26, the process proceeds to a delay in Step 36. In an exemplary embodiment, the delay in Step 36 may be 0.5 seconds. After the delay in Step 36, the process loops back to the beginning of the process in Decision Block 12. By looping back every 0.5 seconds, the system may be able to periodically determine if the light should be on.

On the other hand, if the answer to Decision Block 20 is "Yes," the process proceeds to Decision Block 28. A time delay criterion may be used to guard against frequent switching of a light between on and off conditions. In an exemplary embodiment, the length of the time delay may be 10 minutes. In alternative embodiments, different time delays may be used. A "Yes" answer to Decision Block 20 may mean that the value of the Sensor Signal is greater than $S_{off}$. At that point, the off timer in microprocessor 716 begins to count the length of time that the value of the Sensor Signal is greater than $S_{off}$. For example, the value of Sensor Signal may be greater $S_{off}$ for a length of time that is less than the time delay when it may become less than $S_{off}$. In such a case, the answer to Decision Block 28 is "Yes" and the process proceeds to Step 30.

The exemplary device keeps track of elapsed time in order to know when the time delay has expired. The time delay prevents frequent switching of the light between on and off. Such switching may occur with a quick passing cloud. The program counts the number of processor loops. Each loop is a programmed amount of time. In an exemplary embodiment, the programmed amount of time may be 0.5 seconds. In alternative embodiments, the programmed amount of time may be more or less than 0.5 seconds. Since the time of each loop of the microprocessor is known, counting the loops keeps track of the time delay. In Step 30, a value of 1 is added to the offtimer in order to add time to the process of keeping track of the elapsed time. The process may proceed to Decision Block 32 directly from Step 30. Alternatively, the process may proceed to Decision Block 32 if the answer to Decision Block 28 is "No." In Decision Block 32, the system determines if the value of the Sensor Signal has been greater than $S_{off}$ for period of time that exceeds the preset time delay. If the answer to Decision Block 32 is "Yes," the process proceeds to Step 34. At Step 34, microprocessor 716 turns off the light by opening relay switch 722. After Step 34, the system proceeds to the delay in Step 36 for the reasons stated above. On the other hand, if the answer to Decision Block 332 is "No," the switch is not opened and the light is not turned off. Instead, the process goes to Step 36 for the reasons stated above.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A method of programming a switch having a processor and a memory to control an electric luminaire in an indoor space responsive to signals from a photosensor, the method comprising the steps of:
    (a) calculating a first plurality of sensor signal values when the photosensor is disposed at a first location within the space;
    (b) calculating a second plurality of sensor signal values when the photosensor is disposed at a second location within the space;
    (c) calculating a first threshold value for causing the switch to turn on the luminaire when light in the space is less than a first value; and
    (d) calculating a second threshold value for causing the switch to turn off the luminaire when light in the space is greater than a second value; and
    (e) storing the first and second threshold values in the memory,
wherein the calculations performed in steps (c) and (d) are based on the sensor signal values calculated in steps (a) and (b).

2. The method of programming a switch in claim 1, further comprising the steps of:
    turning the luminaire off before calculating one of the first plurality of sensor signal values; and
    turning the luminaire on before calculating another one of the first plurality of sensor signal values.

3. The method of claim 1, further comprising the steps of:
    turning the luminaire off before calculating one of the second plurality of sensor signal values; and
    turning the luminarie on before calculating another one of the second plurality of sensor signal values.

4. A method of programming a switch having a processor and a memory to control an electric luminaire in an indoor space responsive to signals from a photosensor, the method comprising the steps of:
    (a) turning the luminaire off;
    (b) calculating a first sensor signal value when the photosensor is disposed at a first location within the space;
    (c) turning the luminaire on;
    (d) calculating a second sensor signal value when the photosensor is disposed at the first location within the space;
    (e) turning the luminaire off;
    (f) calculating a third sensor signal value when the photosensor is disposed at another location within the space;
    (g) turning the luminaire on; and
    (h) calculating a fourth sensor signal value when the photosensor is disposed at the other location within the space.

5. The method of programming a switch in claim 4, further comprising the steps of:
    (i) calculating a first threshold value for causing the switch to turn on the luminaire when light in the space is less than a first value; and
    (j) calculating a second threshold value for causing the switch to turn off the luminaire when light in the space is greater than a second value; and
    (k) storing the first and second threshold values in the memory, wherein the calculations in steps (i) and (j) are based on the sensor signal values calculated in steps (b), (d), (f) and (h).

6. The method of claim 5, wherein the calculation in step (i) is based on the sensor signal values calculated in steps (b), (d), and (f).

7. The method of claim 5, wherein the calculation in step (j) uses the sensor signal values calculated in steps (b), (d), (f), and (h).

8. A machine-readable medium having encoded on the medium a program code, wherein, when the program code is executed by a machine, the machine implements a method for programming a switch to control an electric luminaire in an indoor space, the method comprising the steps of:

(a) calculating a first plurality of sensor signal values when the photosensor is disposed at a first location within the space;

(b) calculating a second plurality of sensor signal values when the photosensor is disposed at a second location within the space;

(c) calculating a first threshold value for causing the switch to turn on the luminaire when light in the space is less than a first value;

(d) calculating a second threshold value for causing the switch to turn off the luminaire when light in the space is greater than a second value; and (e) storing the first and second threshold values in the memory wherein the calculations performed in steps (c) and (d) are based on the sensor signal values calculated in steps (a) and (b).

* * * * *